United States Patent
Kimball et al.

(10) Patent No.: US 7,530,174 B1
(45) Date of Patent: May 12, 2009

(54) WADING ROD LEVEL ASSEMBLY

(75) Inventors: Scott Andrew Kimball, Pass Christian, MS (US); Edward C. Vaughn, Slidell, LA (US)

(73) Assignee: The United States of America as represented by the Secretary of the Interior, Washington, DC (US)

( * ) Notice: Subject to any disclaimer, the term of this patent is extended or adjusted under 35 U.S.C. 154(b) by 19 days.

(21) Appl. No.: 11/780,385

(22) Filed: Jul. 19, 2007

(51) Int. Cl.
*G01C 9/26* (2006.01)
(52) U.S. Cl. .......................................... 33/373; 33/354
(58) Field of Classification Search .................. 33/371, 33/379, 390, 354, 370, 373
See application file for complete search history.

(56) References Cited

U.S. PATENT DOCUMENTS

| | | | |
|---|---|---|---|
| 4,432,146 A | 2/1984 | Klein | |
| 4,773,613 A * | 9/1988 | Kawai et al. | 242/384.1 |
| 4,840,062 A * | 6/1989 | Futrell, II | 73/170.29 |
| 4,854,166 A * | 8/1989 | Futrell, II | 73/170.29 |
| 4,866,985 A * | 9/1989 | Futrell, II | 73/170.29 |
| 5,459,985 A | 10/1995 | Gedert | |
| 6,618,680 B2 * | 9/2003 | Ross et al. | 702/45 |
| 6,979,155 B2 | 12/2005 | Dils et al. | |
| D548,124 S * | 8/2007 | Caruana | D10/103 |
| 2002/0169568 A1 * | 11/2002 | Ross et al. | 702/45 |

OTHER PUBLICATIONS

Specification for SonTek FlowTracker, Handheld ADV, <http://www.fondriest.com/pdf/sontek_flowtracker_spec.pdf>.
Bazante et al., Documenting the Importance of Water Flow to Everglades Landscape Structure and Sediment Transport in Everglades National Park, Draft Report, Feb. 2, 2004, 78 pp. (see pp. 25-26), <http://www.eng.miami.edu/~hmsolo/tree/members_only/progrep/ENP_Final.pdf>.

* cited by examiner

*Primary Examiner*—G. Bradley Bennett
(74) *Attorney, Agent, or Firm*—C. Joan Gilsdorf

(57) ABSTRACT

A level assembly for a wading rod used to measure current flow velocity of a wadable body of water, such as a stream or a river. The level assembly includes a level body that is attached to the hexagonal or depth rod of the wading rod at a desired position using a fastener. The level body has a level indicator to determine whether the wading rod is plumb. An alignment bar is attached to the level body and positioned parallel to a wading tagline to aid in maintaining a perpendicular orientation of the wading rod. The level assembly can be repositioned by loosening the fastener, sliding it up or down the depth rod, and re-tightening the fastener at another desired position. The level assembly is used to maintain a level and perpendicular orientation of the top setting wading rod to the tagline, enabling more accurate flow velocity measurements.

13 Claims, 6 Drawing Sheets

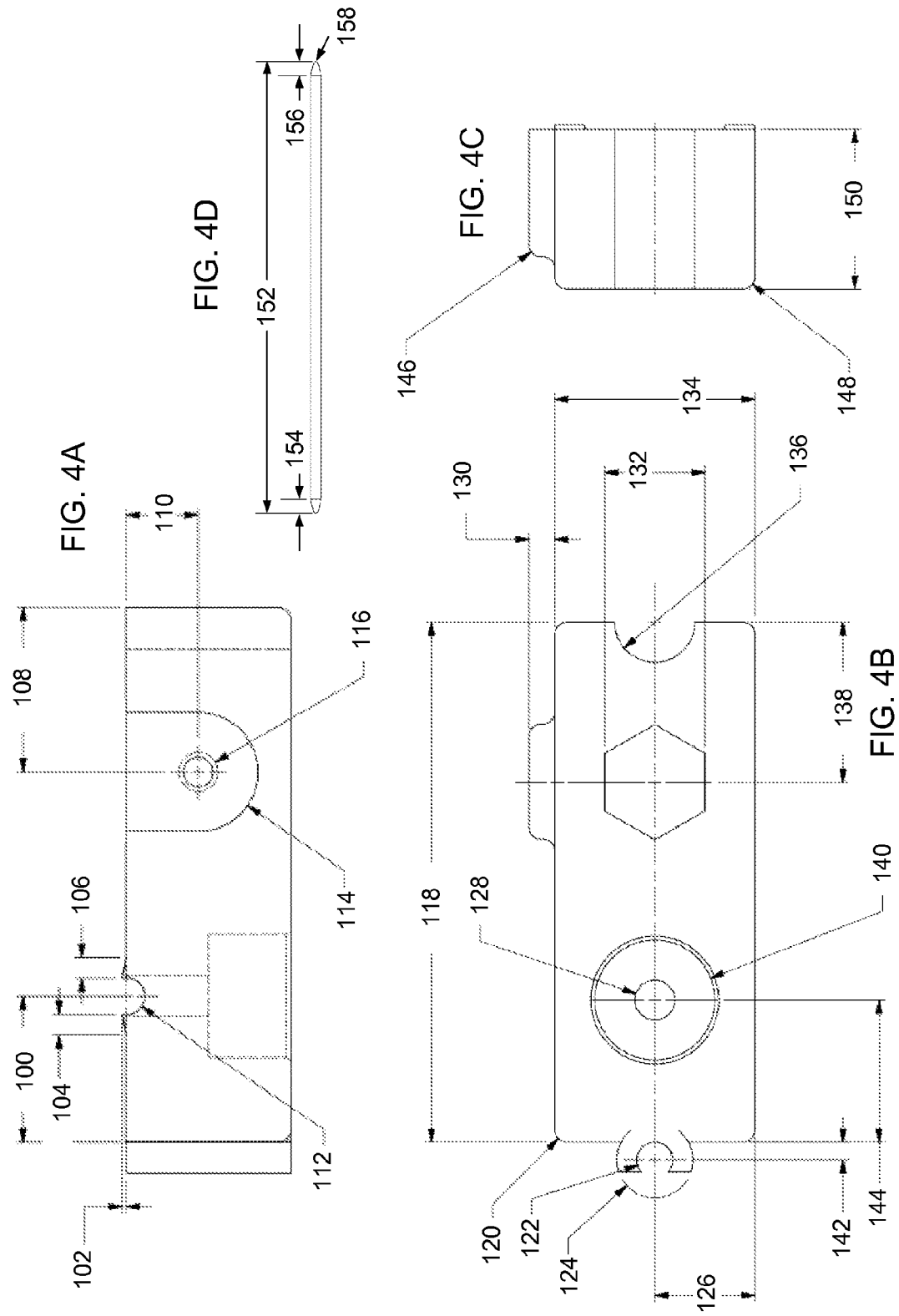

WADING ROD LEVEL ASSEMBLY

STATEMENT OF GOVERNMENT INTEREST

The invention described herein may be manufactured and used by or for the Government of the United States of America for government purposes without the payment of any royalties therefore.

BACKGROUND

1. Field of the Invention

The invention relates in general to the measurement of flow velocity and, in particular, to an adjustable level and alignment bar for use with a top-setting wading rod to aid a hydrographer in maintaining the wading rod plumb and in alignment with the cross-section of a river or stream being measured.

2. Description of the Related Art

When studying wadable streams and rivers, flow measurements are often made using a tagline across the stream or river to measure width, a top-setting wading rod to measure depth, and a current meter (such as a mechanical velocity meter or an acoustic velocity meter) attached to the wading rod to measure flow velocity.

Referring to FIG. 1, a top-setting wading rod 10 typically includes a base 12, a stationary hexagonal rod 14, an adjustable current meter positioning rod 16, and a sliding support assembly 18 to which the current meter (not shown) is attached. The hexagonal rod 14 (also referred to as a "depth rod") attaches to the base 12 and is graduated in 0.1-ft intervals for measuring depth. The sliding support assembly 18 is attached to the lower end of the meter positioning rod 16 and slides up and down the hexagonal rod 14.

The position of the current meter is set by raising or lowering the meter positioning rod 16. The meter-positioning rod 16 is graduated in 1-ft increments. A handle 20 at the top of the hexagonal rod is graduated in 0.1 ft increments. By aligning the marks on the handle 20 with the marks on the meter positioning rod 16 to read the depth, the current meter will be placed at a vertical distance 60% from the surface of the water. For example, if the depth is 2.4 ft, the 2-ft mark on the meter positioning rod 16 is aligned with the mark on the handle 20 representing 0.4 ft. In this position, the current meter will be centered 60% down from the surface of the water. The current meter can be placed at other depth levels (typically 0.2, 0.6, or 0.8 tenths of the depth), as desired or required by the particular situation.

In operation, the tagline (not shown) is positioned perpendicular to the current flow. A hydrographer places the base 12 of the wading rod 10 on the floor of the river or stream next to the tagline and reads the depth using the gradations on the hexagonal rod 14. The hydrographer sets the current meter at a desired level for measuring flow by adjusting the meter positioning rod 16. The current meter is positioned in the water so that it faces directly into the current. The current meter generates a signal proportional to flow velocity. The signal is transmitted through the wading rod 10 to a display (not shown).

When the hydrographer stands in the river or stream, it is difficult to determine whether the wading rod is held plumb due to the disorientation caused by the water flowing around the person making the measurement. Current meters are rated for a perfectly horizontal plane in a testing tank. The hydrographer can position the wading rod too far up or down the stream so that the current meter is out of vertical alignment or at an angle to the current flow. Thus, when the wading rod is not kept plumb and in alignment, the performance and accuracy of the current meter is adversely affected.

Bubble levels (not shown) have been used to help hold the wading rod 10 plumb by being taped or glued or otherwise securely fastened to the wading rod at a specific point, such as on the handle 20. This approach is not satisfactory because it assumes the hydrographer is at the same viewing level as the bubble level. If the wading rod needs to be placed on a rock or boulder for the next measurement, the hydrographer may not be able to see the level to keep the wading rod plumb and aligned. Also, the handle 20 of the top-setting wading rod 10, in practice, is not always in alignment with the hexagonal rod 14. The current meter slides up and down the hexagonal rod 14 and is in perpendicular alignment with it, not the handle 20.

Thus, there is a need for a level that can be easily attached to the wading rod and easily repositioned to make holding the wading rod plumb a simple task.

SUMMARY

The present disclosure describes a wading rod level and alignment device (also referred to as a "level assembly") that attaches to the top setting wading rod to help the hydrographer keep the wading rod plumb and in alignment with the cross-section of the stream being measured. The entire level assembly can be repositioned by sliding it up or down the hexagonal rod so the hydrographer can view the level regardless of the height of the wading rod in relation to the hydrographer. The level assembly also provides a tool to align the current meter to the wading tagline, which is necessary for the use of acoustic meters.

The level assembly includes a level body, a level indicator, and an alignment bar. The level body is attached to the wading rod at a desired position. An opening on the front of the level body receives the level indicator. A groove on the back of the level body opposite the level indicator receives the alignment bar. The alignment bar, when positioned in the groove with the level body attached to the wading rod, is positioned parallel to a wading tagline and perpendicular to the current flow. The level body has a clasp on an end of the level body near the level indicator to receive the alignment bar while in transit. The level body attaches to the wading rod by inserting the depth rod through the through hole. A channel on the other end of the level body opposite the clasp receives the current meter positioning rod. The level body is secured to the hexagonal rod using a fastener, such as a screw, that is inserted through a hole on the top of the level body above the through hole. The level body is repositioned at a different desired position by loosening the screw, sliding the level body up or down the hexagonal rod to the different desired position, and retightening the screw. The level body is constructed of a nonconductive material and operates as a spacer between the hexagonal rod and the current meter positioning rod to prevent electrical shorting of the wading rod.

The level assembly is used to maintain a level and perpendicular orientation of the top setting wading rod to the tagline, enabling more accurate flow velocity measurements. It also provides a spacer operation to prevent electrical shorting of the top setting wading rod. The alignment bar may also serve as a stylus for the hydrographer using a touch screen device for field work such as a Personal Digital Assistant or PDA.

Various aspects and advantages will become apparent from the following detailed description, taken in conjunction with the accompanying drawings, which are not necessarily drawn to scale.

BRIEF DESCRIPTION OF THE DRAWINGS

FIG. 4A is a top view for illustrating dimensions of the level assembly of FIG. 2;

FIG. 4B is a front view for illustrating dimensions of the level assembly of FIG. 2;

FIG. 4C is a side view for illustrating dimensions of the level assembly of FIG. 2;

FIG. 4D illustrates dimensions of an alignment bar shown in FIG. 2;

DESCRIPTION

Figure 1:
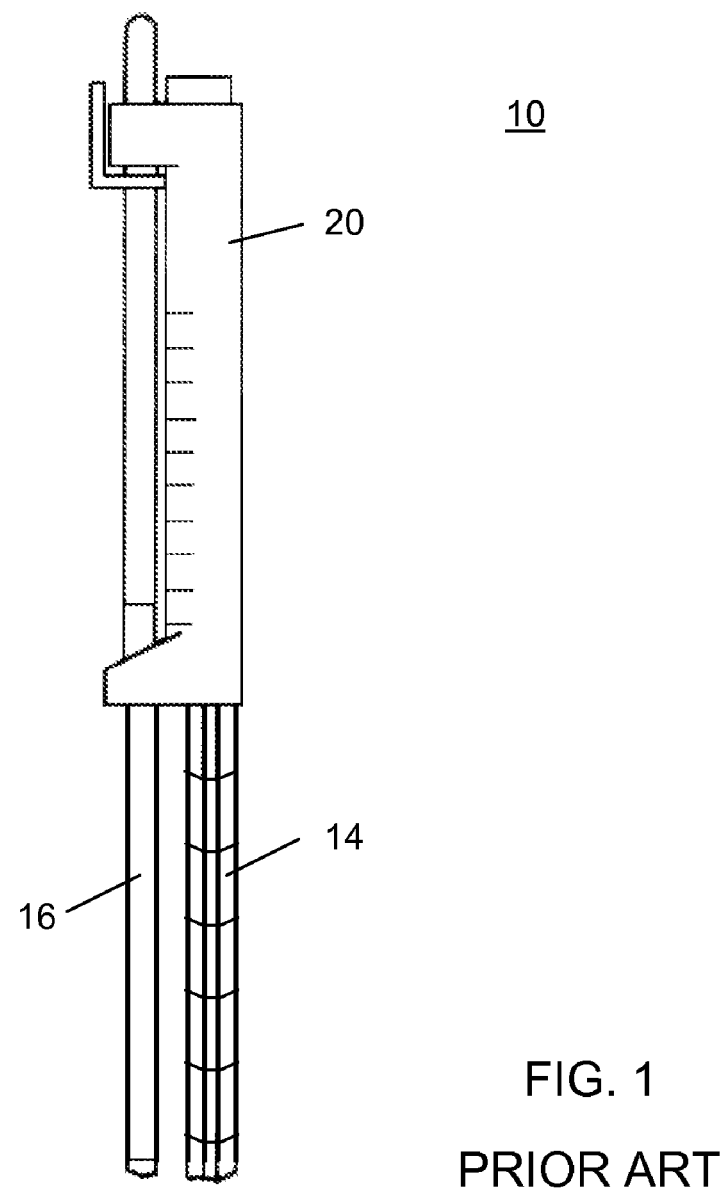
FIG. 1 illustrates a conventional top-setting wading rod.
Figure 1:
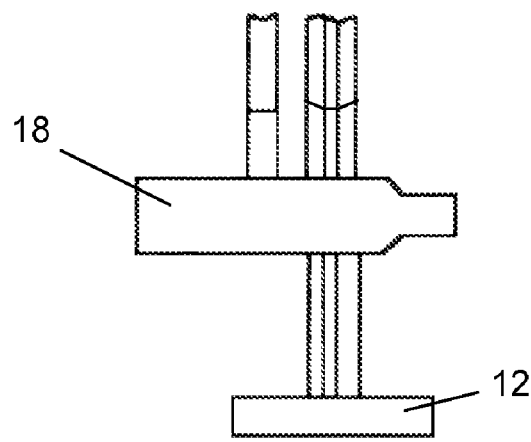
Figure 2:
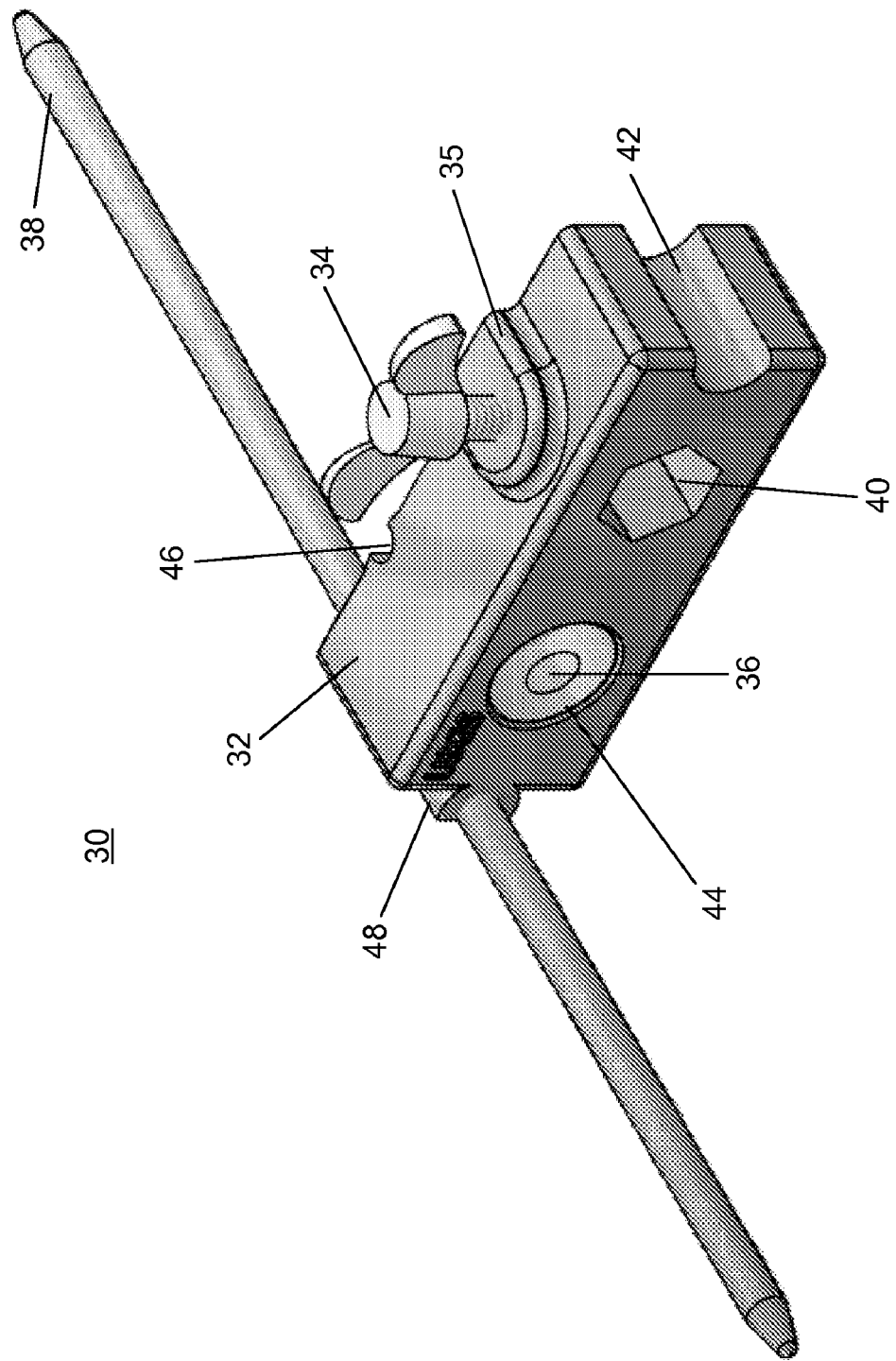
FIG. 2 is a perspective view of a wading rod level assembly, according to an embodiment of the invention.
Figure 3A:
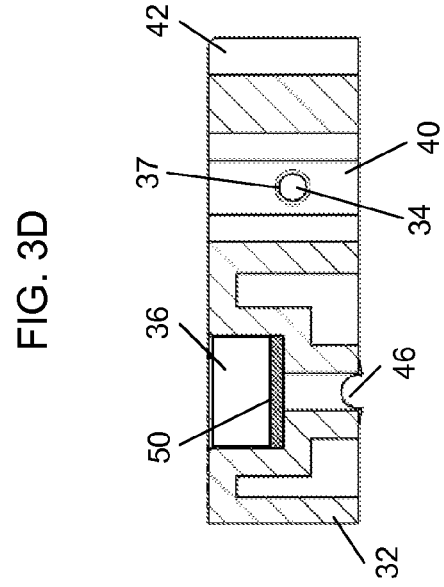
FIG. 3A is a top view of the level assembly of FIG. 2.
Figure 3D:
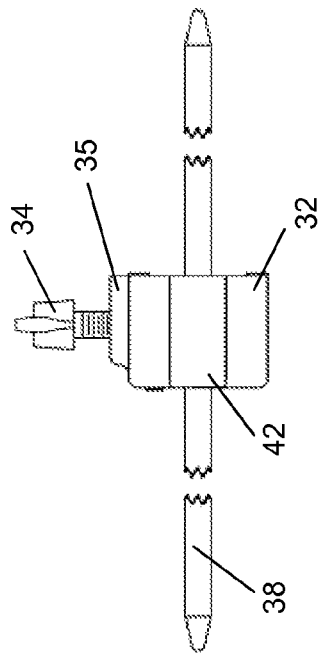
FIG. 3D is a cross-sectional view of FIG. 3B taken along the line I-I.
Figure 3B:
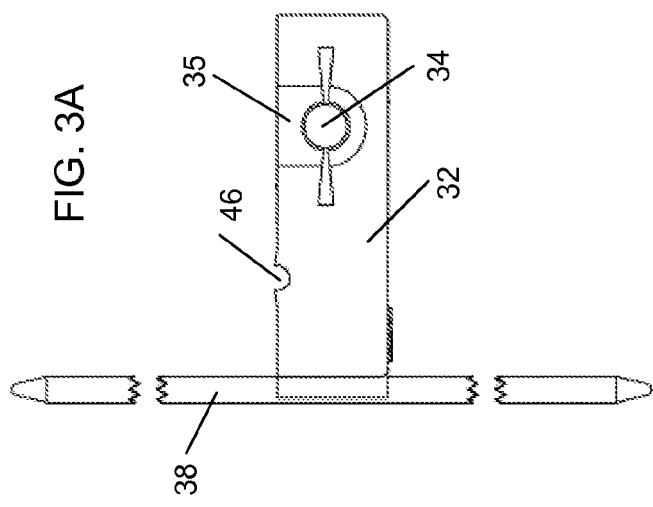
FIG. 3B is a front view of the level assembly of FIG. 2.
Figure 3C:
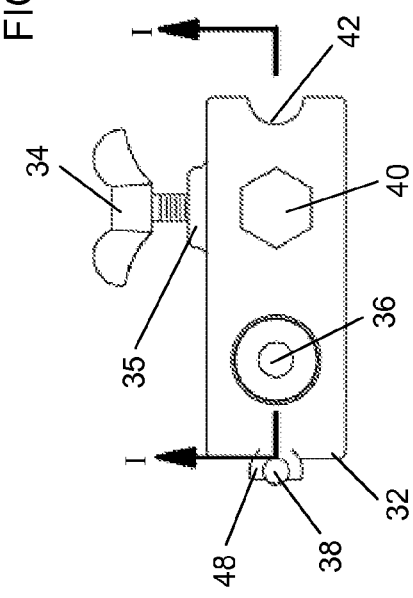
FIG. 3C is a side view of the level assembly of FIG. 2.

FIG. 2 illustrates a perspective view of a wading rod level assembly 30, which includes a level body 32, a fastener 34 to hold the level body 32 onto the hexagonal rod 14 of the wading rod 10, a level indicator 36, and an alignment bar 38. A top view, a front view, and a side view of the level assembly 30 are shown in FIG. 3A, FIG. 3B, and FIG. 3C, respectively. A cross-sectional view of FIG. 3B taken along the line I-I is shown in FIG. 3D.

The level body 32 has a through hole 40 to receive the hexagonal rod 14. A channel 42 on one side of the level body 32 receives and fits partially around the meter positioning rod 16 when the level body 32 is placed on the hexagonal rod 14. The fastener 34 holds the level body 32 on the hexagonal rod 14 at a desired position. The fastener 34 can be a screw, for example. The fastener 34 shown in the embodiment of FIG. 2 is a wing screw that can be conveniently loosened and tightened when it is desired to reposition the level body 32. A boss 35 on the top of the level body 32 above the through hole 40 has a hole 37 to receive the fastener 34. The level body 32 has an opening 44 on the front of the level body 32 to receive the level indicator 36. The level indicator 36 can be a bubble level, for example. The level indicator 36 shown in the embodiment of FIG. 2 is a circular bullseye bubble level. The level indicator 36 is secured to the level body 32, for example, by applying an adhesive 50 (see FIG. 3D) to the bottom of the opening 44 that receives the level indicator 36.

The back of the level body 32 has a groove 46, opposite the opening 44 that receives the level indicator 36, to receive the alignment bar 38. In operation, the alignment bar 38 slides into, or is snapped into, the groove 46. In this position, the alignment bar 38 is perpendicular to the current meter. The hydrographer positions the wading rod 10 so that the alignment bar 38 is parallel to the tagline, which correctly positions the current meter into the flow of water. The level body 32 has a catch 48 projecting from the side of the level body 32 opposite the channel 42 that receives the meter positioning rod 16. The catch 48 is used to hold the alignment bar 38 while in transit, as shown in FIG. 2 and FIGS. 3A to 3C.

The level body 32 and the alignment bar 38 may be constructed of plastic and be injection molded. Other materials may be used, such as stainless steel. Preferably, the material used is nonconductive, which allows the level body 32 to operate as a spacer that prevents electrical shorting of the wading rod 10.

Figure 4E:
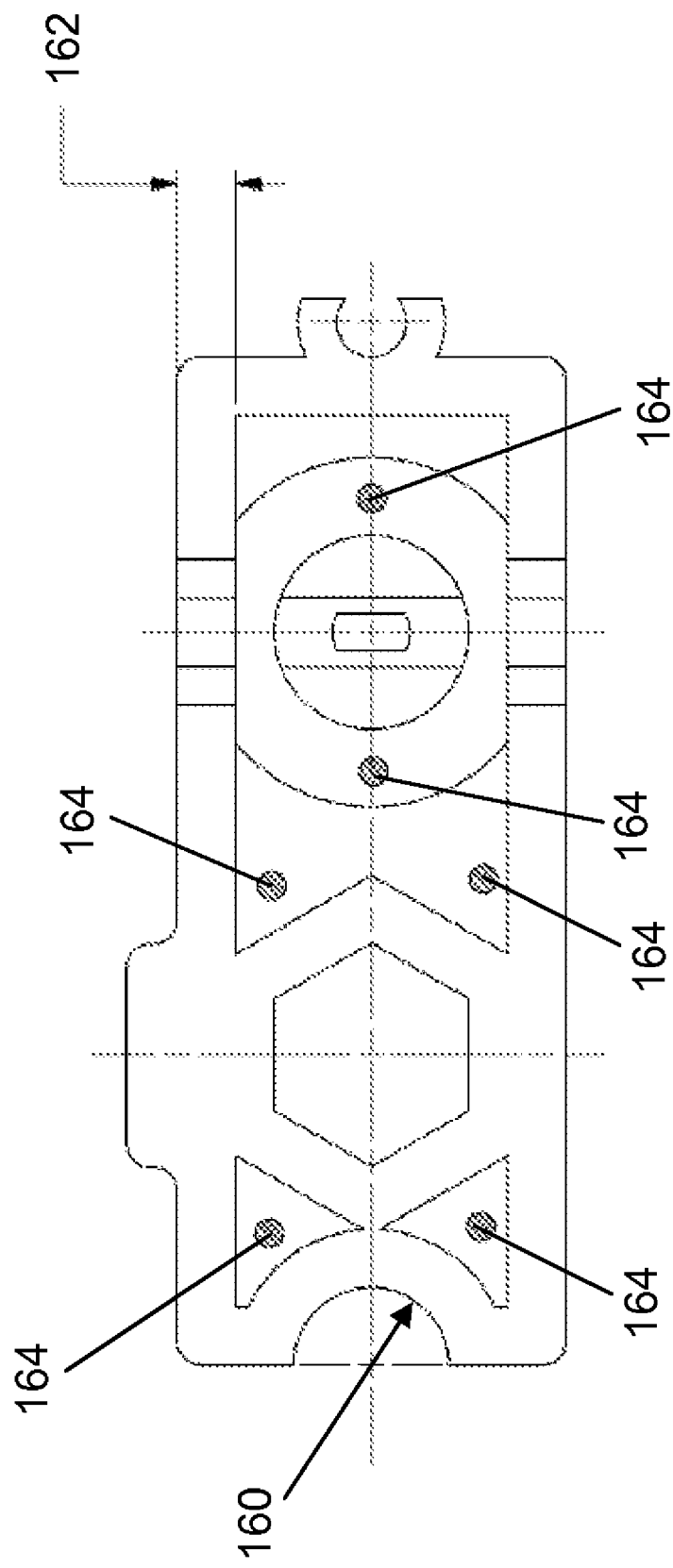
FIG. 4E is a back view for illustrating dimensions of the level assembly of FIG. 2.

While the dimensions of the level body 32 and the alignment bar 38 may vary depending on the particular wading rod used, exemplary dimensions are provided in the table below with reference to FIGS. 4A to 4D. FIG. 4A is a top view of the level body 32. FIG. 4B is a front view of the level body 32. FIG. 4C is a side view of the level body 32. FIG. 4D shows the alignment bar 38. FIG. 4E is a back view of the level body 32. The embodiment shown in FIG. 4E illustrates ejector pin locations and depressions 164 for an injection-molded level body 32. In the table below, "R" is radius, "Φ" is diameter, and "CHAM" refers to a 45-degree chamfer. The dimensions associated with reference number 116 refer to internal thread size.

TABLE

LEVEL ASSEMBLY DIMENSIONS

| Reference No. | Dimensions | Reference No. | Dimensions |
| --- | --- | --- | --- |
| 100 | 0.71 in (18.0 mm) | 132 | 0.50 in (12.7 mm) |
| 102 | 0.02 in (0.5 mm) | 134 | 1.00 in (25.4 mm) |
| 104 | 0.10 in (2.5 mm) | 136 | R 0.20 in (5.1 mm) |
| 106 | 0.10 in (2.5 mm) | 138 | 0.80 in (20.3 mm) |
| 108 | 0.80 in (20.3 mm) | 140 | Φ 0.60 in (15.2 mm) × 0.40 in (10.2 mm) deep, 0.02 in (0.5 mm) × 45 CHAM |
| 110 | 0.35 in (8.9 mm) | 142 | 0.09 in (2.3 mm) |
| 112 | Φ 0.18 in (4.6 mm) | 144 | 0.71 in (18.0 mm) |
| 114 | R 0.29 in (7.4 mm) | 146 | R 0.06 in (1.5 mm) |
| 116 | 10-24 UNC-2B | 148 | R 0.06 in (1.5 mm) |
| 118 | 2.60 in (66.0 mm) | 150 | 0.80 in (20.32 mm) |
| 120 | R 0.06 in (1.5 mm) | 152 | 8.0 in (203 mm) |
| 122 | R 0.09 in (2.3 mm) | 154 | 0.30 in (6.0 mm) |
| 124 | R 0.19 in (4.8 mm) | 156 | 0.30 in (6.0 mm) |
| 126 | 0.50 in (12.7 mm) | 158 | Φ 0.07 in (1.8 mm) |
| 128 | Φ 0.20 in (5.1 mm) | 160 | 0.90 in wall thickness |
| 130 | 0.13 in (3.3 mm) | 162 | 0.15 in (3.8 mm) wall thickness |

Figure 5:
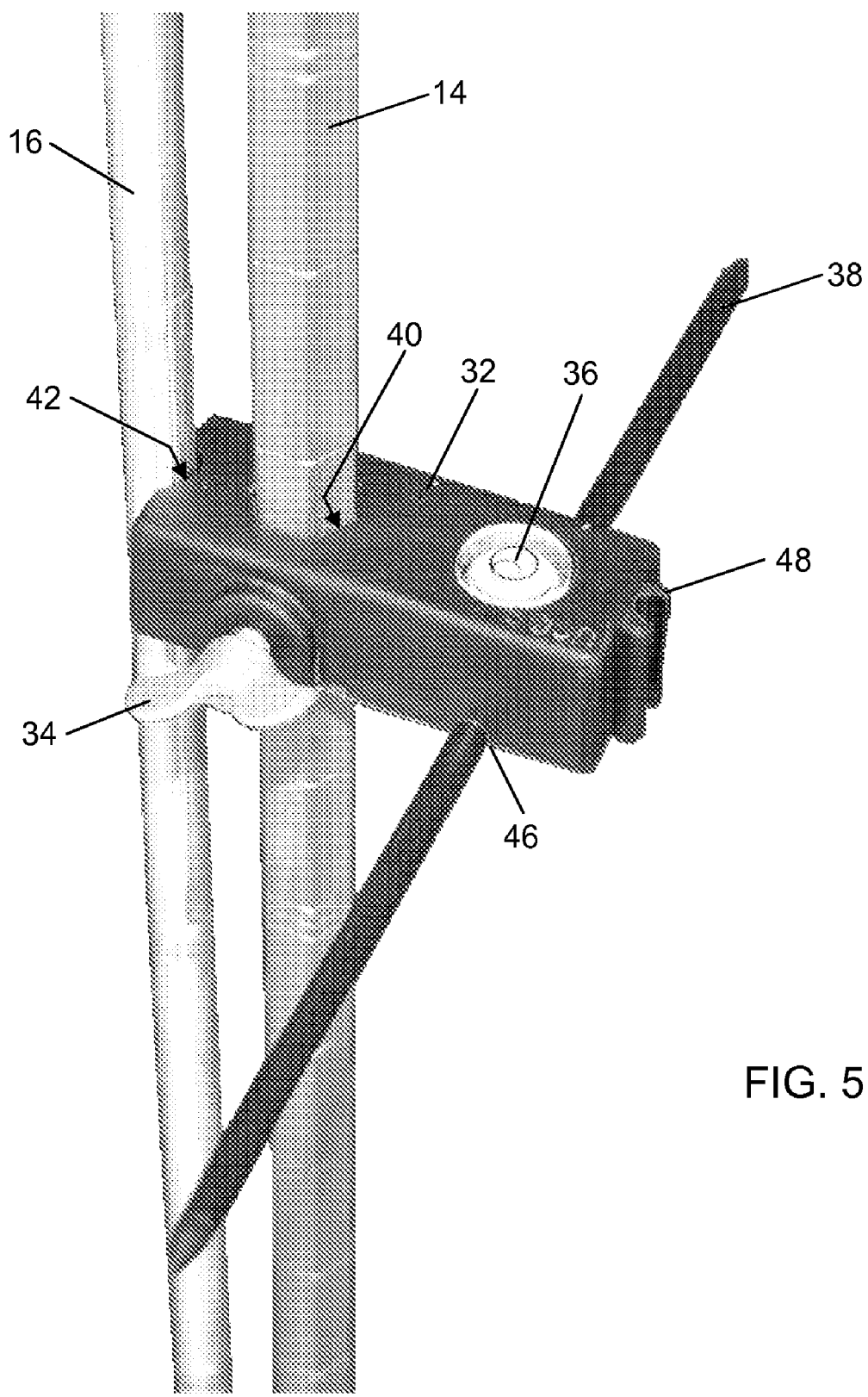
FIG. 5 illustrates the level assembly attached to a wading rod.

FIG. 5 illustrates the wading rod level assembly 30 attached to the wading rod 10. In operation, the level body 32 is inserted onto the hexagonal rod 14 of the wading rod 10 through the through hole 40 and the channel 42 is positioned against the meter positioning rod 16. In this position, the level indicator 36 faces upward. The level body 32 is secured to the hexagonal rod 14 using the fastener 34. The alignment bar 38 is placed in the groove 46. For each measurement, the hydrographer views the level indicator 36 to position the wading rod 10 so that it is level, and aligns the alignment bar 38 with the tagline. For any measurement that requires the wading rod 10 to be positioned such that the hydrographer can no longer view the level indicator 36, such as when the wading rod must be placed on a rock or boulder, the hydrographer loosens the fastener 34, slides the level body 32 up or down the hexagonal rod 14, and re-secures the level body 32 by tightening the fastener 34 against the hexagonal rod 14.

The wading rod level assembly 30 of the present invention can be adjusted to a higher or lower position on the wading rod 10 for better viewing. The adjustable level and alignment bar aid the hydrographer in maintaining a level and perpendicular orientation of the wading rod 10 to the tagline to facilitate more accurate readings. In addition, the level body 32 operates as a spacer to prevent electrical shorting of the wading rod 10. Hence, the wading rod level assembly of the present disclosure is more convenient to use and enables more accurate flow velocity measurements than provided by prior art wading rods.

It will be appreciated by those skilled in the art that modifications and variations of the present invention are possible without departing from the principles and spirit of the invention, the scope of which is defined in the appended claims and their equivalents. For example, the present disclosure describes use of the level assembly with a top setting wading rod. However, the level assembly may be adapted to work with other types of wading rods used to make river or stream flow measurements. The alignment bar can be made telescopic or longer than the length shown in FIG. 4D to aid the hydrographer in aligning the alignment bar with the tagline. The alignment bar can be made hollow to allow the wading tagline to pass through it, making alignment easier. A lanyard can be used to secure the alignment bar to the level body to prevent loss of the alignment bar. Another lanyard can be used to secure the fastener to the level body to prevent loss of the fastener. The level indicator can be secured to the level body using a set screw instead of adhesive to facilitate replacement if the level indicator becomes damaged or broken. Also, a small rotating prism or mirror can be added to the level body to aid in viewing of the level indicator. Accordingly, the invention is not limited by the foregoing description or drawings, but is only limited by the scope of the appended claims.

What is claimed is:

1. A level assembly, for a wading rod used to measure current flow velocity and having a current meter sliding support assembly, to indicate whether the wading rod is perpendicular to the current flow of a wadable body of water being measured, the level assembly comprising:
    an adjustable level body attached to the wading rod at an initial desired position, the level body being repositionable by sliding it up or down the wading rod to another desired position;
    a level indicator connected to the level body to indicate whether the wading rod is perpendicular to the current flow; and
    an alignment bar removably attached to the level body and positioned parallel to a width of the body of water to align the sliding support assembly parallel to the current flow of the body of water being measured.

2. The level assembly of claim 1, wherein the level body comprises an opening on a front of the level body to receive the level indicator.

3. The level assembly of claim 2, further comprising means for securing the level indicator within the opening.

4. The level assembly of claim 1, wherein the level indicator comprises a circular bullseye bubble level.

5. The level assembly of claim 1, wherein
    a tagline is used to measure the width of the body of water being measured; and
    the level body comprises a groove on a back of the level body opposite the level indicator to receive the alignment bar, and the alignment bar, when positioned in the groove with the level body attached to the wading rod, is positioned parallel to the tagline and perpendicular to the current flow.

6. The level assembly of claim 1, wherein
    the wading rod comprises a depth rod used to determine the depth of the body of water being measured and an adjacent, adjustable current meter positioning rod;
    the level body comprises a first end having a groove and a through hole on a side of the level body near the first end; and
    the level body attaches to the wading rod by inserting the depth rod through the through hole with the groove of the level body receiving the current meter positioning rod.

7. The level assembly of claim 6, wherein the level body comprises a second end, opposite the first end, with a catch to receive the alignment bar while in transit.

8. The level assembly of claim 6, further comprising means for attaching the level body to the wading rod at the desired position.

9. The level assembly of claim 8, wherein the means for attaching the level body to the wading rod comprises:
    an upper hole on a top of the level body extending to the through hole that receives the depth rod of the wading rod;
    and a screw that is inserted through the upper hole and tightened against the depth rod to hold the level body in place,
    wherein the level body is repositioned at a different desired position by loosening the screw, sliding the level body up or down the depth rod to the different desired position, and retightening the screw.

10. The level assembly of claim 6, wherein the level body is constructed of a nonconductive material and operates as a spacer between the depth rod and the current meter positioning rod to prevent electrical shorting of the wading rod.

11. The level assembly of claim 1, wherein the level body and the alignment bar are constructed of plastic and injection molded.

12. A wading rod for measuring current flow velocity of a body of water, comprising:
    a base;
    a depth rod attached to the base and having gradations for indicating depth of the body of water;
    a current meter positioning rod adjacent to the depth rod;
    a current meter sliding support assembly attached to a lower end of the current meter positioning rod;
    a handle attached to a top of the depth rod and receiving a top of the current meter positioning rod;
    an adjustable level body attached to the depth rod at an initial desired position, the level body being repositionable by sliding it up or down the depth rod to another desired position;
    a level indicator connected to the level body to indicate whether the wading rod is perpendicular to the current flow; and
    an alignment bar removably attached to the level body and positioned parallel to a width of the body of water to align the current meter sliding support assembly parallel to the current flow of the body of water being measured.

13. A method of positioning a wading rod perpendicular to the current flow of a body of water being measured, the wading rod having a depth rod and a current meter sliding support assembly attached to a current meter positioning rod, the method comprising:
    attaching an adjustable level body with a level indicator to the depth rod at an initial viewing position and securing the adjustable level body to the depth rod using a fastener;
    attaching an alignment bar to the level body and positioning the alignment bar parallel to a width of the body of water to align the current meter sliding support assembly parallel to the current flow of the body of water being measured;
    moving the wading rod until the level indicator indicates the wading rod is level and rotating the wading rod until the alignment bar is parallel to the width of the body of water to correctly orient the wading rod for current flow velocity measurement; and
    repositioning the level body to facilitate current flow velocity measurement by loosening the fastener, sliding the level body up or down the depth rod to another viewing position, and retightening the fastener.

* * * * *